(12) United States Patent
Foitzik et al.

(10) Patent No.: US 11,958,453 B2
(45) Date of Patent: Apr. 16, 2024

(54) METHOD FOR OPERATING A BRAKE SYSTEM, AND BRAKE SYSTEM

(71) Applicant: Robert Bosch GmbH, Stuttgart (DE)

(72) Inventors: Bertram Foitzik, Ilsfeld (DE); Joerg Riethmueller, Heilbronn (DE); Oliver Fuchs, Ilsfeld (DE); Timo Haible, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 497 days.

(21) Appl. No.: 17/258,413

(22) PCT Filed: May 25, 2019

(86) PCT No.: PCT/EP2019/063553
§ 371 (c)(1),
(2) Date: Jan. 6, 2021

(87) PCT Pub. No.: WO2020/020518
PCT Pub. Date: Jan. 30, 2020

(65) Prior Publication Data
US 2022/0348177 A1    Nov. 3, 2022

(30) Foreign Application Priority Data

Jul. 24, 2018   (DE) .................... 10 2018 212 284.9

(51) Int. Cl.
*B60T 13/74* (2006.01)
*B60T 8/40* (2006.01)
(Continued)

(52) U.S. Cl.
CPC .......... *B60T 13/745* (2013.01); *B60T 8/4054* (2013.01); *B60T 13/142* (2013.01); *B60T 13/18* (2013.01);
(Continued)

(58) Field of Classification Search
CPC ...... B60T 7/042; B60T 13/142; B60T 13/686; B60T 13/75; B60T 17/22; B60T 8/404;
(Continued)

(56) References Cited

U.S. PATENT DOCUMENTS

| 5,496,097 A * | 3/1996 | Eckert ..................... B60T 17/22 |
| | | 303/155 |
| 10,919,512 B2 * | 2/2021 | Foitzik .................. B60T 13/662 |

(Continued)

FOREIGN PATENT DOCUMENTS

| CN | 103241228 A | 8/2013 |
| CN | 104884317 A | 9/2015 |

(Continued)

OTHER PUBLICATIONS

International Search Report for PCT/EP2019/063553, dated Oct. 2, 2019.

*Primary Examiner* — Thomas J Williams
(74) *Attorney, Agent, or Firm* — NORTON ROSE FULBRIGHT US LLP; Gerard A. Messina (57) ABSTRACT

A method for operating a brake system. A brake request signal characterizing a brake request is generated by actuating a positioner system of an actuating circuit, and a setpoint brake pressure required in an active circuit is ascertained based on the brake request signal. An actual brake pressure is set in the active circuit according to the setpoint brake pressure using a pressure generation device by moving a displacement piston using an electric motor to actuate a wheel brake coupled with the active circuit. Under the condition that the brake request signal is constant over a predefined period of time, a pressure modulation is carried out, which includes setting the actual brake pressure in the active circuit to a value that is greater than the setpoint brake pressure, and lowering the actual brake pressure by moving (Continued)

the displacement piston using the electric motor until the setpoint brake pressure is reached.

14 Claims, 3 Drawing Sheets

(51) Int. Cl.
*B60T 13/14* (2006.01)
*B60T 13/18* (2006.01)
*B60T 13/68* (2006.01)
*B60T 7/04* (2006.01)
*B60T 17/22* (2006.01)

(52) U.S. Cl.
CPC ............ *B60T 13/686* (2013.01); *B60T 7/042* (2013.01); *B60T 17/22* (2013.01); *B60T 2240/00* (2013.01); *B60T 2270/82* (2013.01); *B60T 2270/88* (2013.01)

(58) Field of Classification Search
CPC ............... B60T 8/4054; B60T 2240/00; B60T 2270/82; B60T 2270/88; B60T 13/18
See application file for complete search history.

(56) References Cited

U.S. PATENT DOCUMENTS

| | | | |
|---|---|---|---|
| 2013/0080016 A1* | 3/2013 | Bohn | ............... B60T 8/176 |
| | | | 701/78 |
| 2013/0332043 A1 | 12/2013 | Svensson et al. | |
| 2016/0200299 A1* | 7/2016 | Böhm | ............... B60T 13/66 |
| | | | 303/9.62 |
| 2017/0297454 A1* | 10/2017 | Pang | ............... B60L 15/2036 |
| 2018/0162341 A1* | 6/2018 | Irwan | ............... B60T 13/686 |
| 2022/0348177 A1* | 11/2022 | Foitzik | ............... B60T 7/02 |

FOREIGN PATENT DOCUMENTS

| | | |
|---|---|---|
| DE | 102011079454 A1 | 1/2013 |
| DE | 102011084746 A1 | 4/2013 |
| DE | 102014220432 A1 | 4/2016 |
| DE | 102015119773 A1 | 5/2017 |
| DE | 102016208564 A1 | 11/2017 |
| EP | 3333031 A1 | 6/2018 |
| JP | H10194109 A | 7/1998 |
| JP | 2013159157 A | 8/2013 |
| JP | 2015058833 A | 3/2015 |
| KR | 20170118524 A | 10/2017 |
| WO | 2014195092 A1 | 12/2014 |

* cited by examiner

METHOD FOR OPERATING A BRAKE SYSTEM, AND BRAKE SYSTEM

BACKGROUND INFORMATION

Brake systems for vehicles, in particular for motor vehicles such as cars or trucks, are usually realized in the form of electrohydraulic brake systems in which a master brake cylinder actuated by a manual actuation device generates a hydraulic pressure in a brake circuit in order to actuate wheel brakes. Generally, a pressure generation device, which has an electric motor and a displacement piston or plunger which is movable with the aid of the electric motor, assists in the pressure generation in the brake force characteristic To an increasing extent, what is known as brake-by-wire systems are used as well. Such a system is described in German Patent Application No. DE 10 2011 079 454 A1, for example. An actuating circuit in which a hydraulic pressure is generated by actuating a master brake cylinder is provided in this brake system. This pressure is acquired, and based on the acquired pressure, a setpoint brake pressure is ascertained, which is set in an active circuit for the operation of the wheel brakes by a pressure generation device that includes an electric motor and a displacement piston movable by the electric motor.

SUMMARY

The present invention relates to a method for operating a brake system and to a brake system for a vehicle, in particular for a motor vehicle.

According to a first aspect of the present invention, a method is provided for operating a brake system for a vehicle.

In the method according to an example embodiment of the present invention, a brake request signal, which characterizes a brake request, is generated by actuating a positioner system of an actuating circuit. Thus, a signal which represents a desired deceleration of the vehicle is generated in this step.

In a further step, a setpoint brake pressure required in an active circuit is ascertained based on the brake request signal. The brake request signal thus forms an input variable for an ascertainment function, which may be realized in the form of a software module, for example. This ascertainment function ascertains as an output variable a value for a brake pressure to be set in an active circuit.

In addition, an actual brake pressure according to the setpoint brake pressure is set in the active circuit with the aid of a pressure generation device by moving a displacement piston of the pressure generation device with the aid of an electric motor of the pressure generation device in order to actuate a wheel brake coupled with the active circuit. In particular, the electric motor may be coupled with the displacement piston via a gear unit, which converts a rotary movement of the electric motor into a translatory movement of the displacement piston in order to vary the pressure in the active circuit and to thereby operate a wheel brake which is acting on a wheel of the vehicle.

According to the example embodiment of the present invention, a pressure modulation is carried out under the condition that the brake request signal is constant over a predefined period of time. In this context, the actual brake pressure in the active circuit is first set to a value that is greater than the setpoint brake pressure by moving the displacement piston with the aid of the electric motor. Next, the actual brake pressure is lowered until the setpoint brake pressure is reached by moving the displacement piston with the aid of the electric motor, in particular in the opposite direction.

According to a further aspect of the present invention, a brake system for a vehicle is provided.

In accordance with an example embodiment of the present invention, the brake system includes an actuating circuit having a positioner system, actuable by an actuation device, for the generation of a brake request signal; an active circuit having a pressure generation device, which includes an electric motor and a displacement piston, which is movable in a translatory fashion with the aid of the electric motor and coupled with the electric motor by a gear unit; and at least one wheel brake, which is hydraulically coupled with the pressure generation device. In addition, the brake system has a control unit, which is connected to the positioner system of the actuating circuit and to the pressure generation device of the active circuit.

According to an example embodiment of the present invention, the control unit is set up to ascertain from the brake request signal a setpoint brake pressure required in the active circuit, to actuate the electric motor of the pressure generation device for setting an actual brake pressure in the active circuit according to the setpoint brake pressure; and under the condition that the brake request signal is constant over a predefined period of time, to actuate the electric motor to carry out a pressure modulation, which includes setting the actual brake pressure in the active circuit to a value that is greater than the setpoint brake pressure, and to lower the actual brake pressure until the setpoint brake pressure is reached.

In accordance with an example embodiment of the present invention, the loading of the electric motor of the active brake circuit is relieved by carrying out a pressure modulation when the brake request signal is constant over a predefined period of time. To this end, the actual brake pressure in the active circuit is periodically varied for as long as the brake request signal remains constant. In particular, a temporal actual brake pressure characteristic, which approximately resembles a saw-tooth function, is able to be set. In general, an excess pressure above the setpoint brake pressure is set. For this purpose, using the electric motor, the displacement piston is moved in a first direction in order to generate a positive volume flow of a hydraulic fluid into the active circuit. Next, the actual brake pressure is lowered. To do so, the electric motor moves the displacement piston in the opposite direction in order to generate a negative volume flow of the hydraulic fluid out of the active circuit. During the pressure reduction, friction losses occur in the gear unit that couples the electric motor with the displacement piston. They act counter to the movement of the displacement piston and thus decelerate it. This reduces the force the electric motor has to apply to the piston, which leads to a reduction of the mechanical and thermal loading of the electric motor.

According to one embodiment of the present method, the setting of the actual brake pressure in the active circuit takes place to a value greater than the setpoint brake pressure using a temporal pressure gradient that is between ten and fifty times greater than a temporal pressure gradient by which the actual brake pressure is reduced until the setpoint brake pressure is reached. Accordingly, the time required for setting the excess pressure in the actual brake pressure is much less than the time during which the reduction of the actual brake pressure occurs. As a result, a torque to be supplied by the electric motor in order to generate the excess pressure is slightly higher only for a short time, and the torque to be delivered by the electric motor during the lowering of the actual brake pressure is considerably reduced due to the friction losses in the gear unit, in particular in comparison with a torque that would be necessary for a constant setting of the actual brake pressure to the setpoint brake pressure. This further reduces the average torque that has to be supplied by the electric motor.

According to a further embodiment of the method of the present invention, the execution of the pressure modulation additionally requires the presence of the following conditions:

a) An acquired rotational speed of a wheel decelerated by the wheel brake is less than a predefined rotational speed threshold value, b) The ascertained setpoint brake pressure of the active circuit is greater than a predefined pressure threshold value.

For instance, condition a) may be satisfied when the acquired rotational speed is so low that a standstill of the vehicle may be assumed. In particular, the rotational speed threshold value may be defined by a number of revolutions per second of the respective wheel that corresponds to a driving speed of the vehicle of 3 km/h. This offers the advantage that a pressure modulation will not carried be out at higher speeds, which advantageously avoids the driver becoming aware of the pressure modulation.

The condition b) reduces the number of situations in which a pressure modulation is carried out.

According to a further embodiment of the method of the present invention, it is provided that under the condition that the brake request signal is constant over a second predefined time period, a hydraulic decoupling of the wheel brake from the pressure generation device takes place by closing an isolation valve which is situated in a hydraulic path between the pressure generation device and the wheel brake, and by switching off the electric motor. The second predefined time period in particular is considerably longer than the predefined time period following which the pressure modulation is carried out. Accordingly, the pressure in a brake-side section of the hydraulic path extending between the isolation valve and the wheel brake is kept constant in that the isolation valve is closed when the pressure modulation has been carried out over a certain period of time, e.g., a time period of between 30 second and 420 seconds, in particular over a time period of 300 seconds. The electric motor is able to be switched off after the hydraulic decoupling, which further reduces the loading of the electric motor.

According to a further embodiment of the method of the present invention, the positioner system has a master brake cylinder which is actuable by an actuation device, and a sensor system, and the generation of the brake request signal includes an acquisition of a hydraulic pressure generated by the actuation of the master brake cylinder in the actuating circuit, and/or an acquisition of a positioning travel of the actuation device as variables characterizing the brake request. The brake request signal in particular may be formed by the variables that characterize the brake request and are acquired with the aid of the sensor device.

According to one embodiment of the brake system of the present invention, the positioner system has a master brake cylinder which is actuable by the actuation device, and a sensor system for acquiring a hydraulic pressure in the actuating circuit generated by actuating the master brake cylinder, and/or for acquiring a positioning travel of the actuation device as variables characterizing a brake request, the brake request signal being formed by the variables that characterize the brake request and are acquired with the aid of the sensor device.

According to a further embodiment of the brake system of the present invention, it is provided that the active circuit has a pressure sensor for acquiring the actual brake pressure in the active circuit, which is connected to the control unit, and the control unit is set up to actuate the electric motor for the control of the actual brake pressure on the basis of the acquired actual brake pressure. A closed-loop control is realized in this manner.

According to a further embodiment of the brake system of the present invention, the active circuit has an isolation valve, which is situated in a hydraulic path between the pressure generation device and the wheel brake, and the control unit is set up to close the isolation valve for the hydraulic decoupling of the wheel brake from the pressure generation device and to switch off the electric motor of the pressure generation device. As described above in connection with the method, the actual brake pressure in the brake-side section of the hydraulic path is able to be held constant with the aid of the isolation valve when the electric motor is switched off.

In the following text, the present invention will be described in greater detail based on the exemplary embodiments indicated in the schematic figures.

BRIEF DESCRIPTION OF THE DRAWINGS

In the figures, similar, functionally equivalent and similarly acting elements, features and components, unless stated otherwise, have been provided with the same reference numerals.

DETAILED DESCRIPTION OF EXAMPLE EMBODIMENTS

Figure 1:
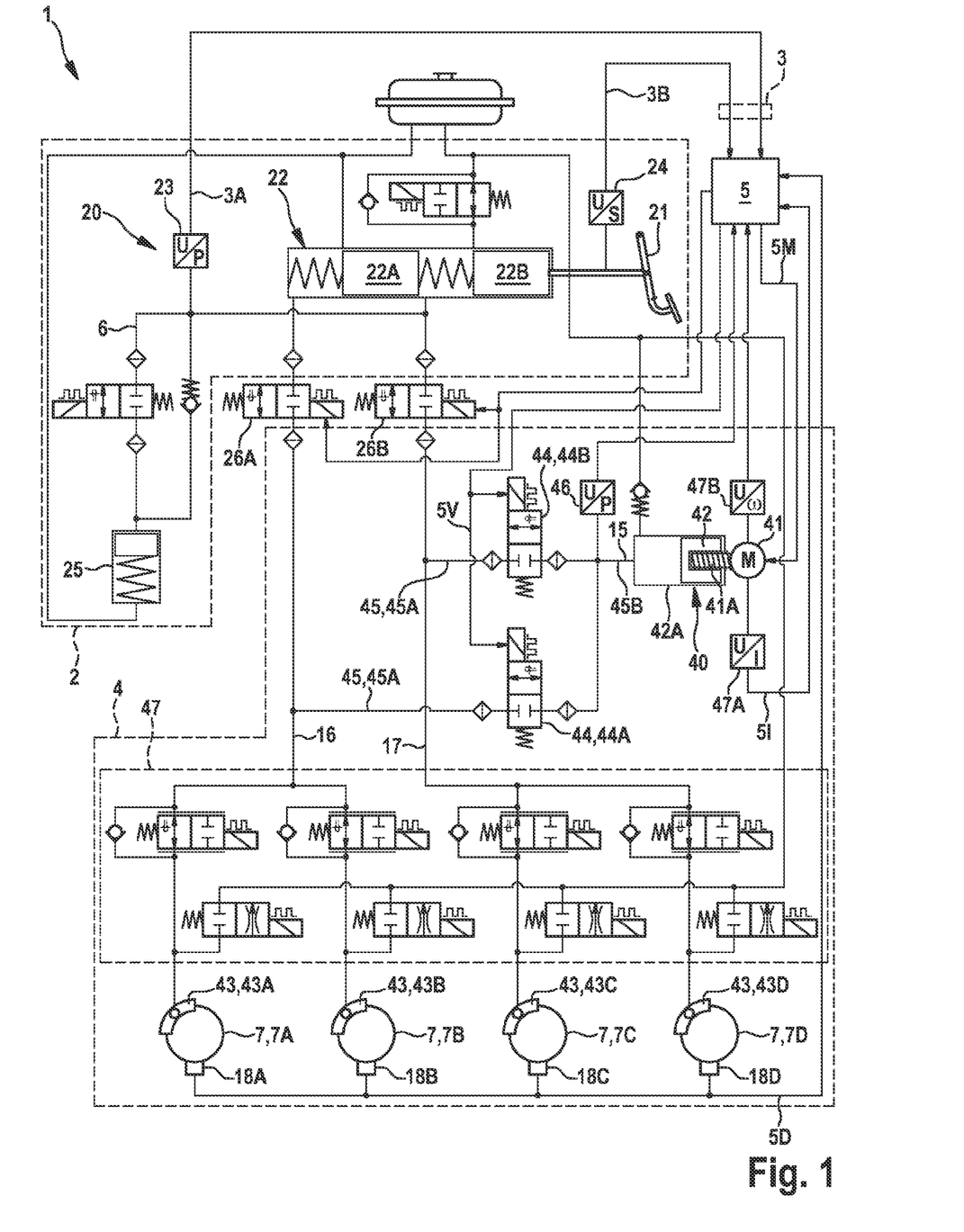
FIG. 1 shows a schematic representation of a brake system according to an exemplary embodiment of the present invention.

FIG. 1 shows a brake system 1 for a vehicle by way of example. As illustrated in FIG. 1, brake system 1 has an actuating circuit 2, an active circuit 4, and a control unit 5.

Actuating circuit 2 exemplarily illustrated in FIG. 1 has a positioner system 20 and an actuation device 21. As illustrated in FIG. 1 by way of example, positioner system 20 in particular may have a hydraulic master brake cylinder 22 as well as a sensor system including at least one pressure sensor 23 and a positioning-travel sensor 24. Positioner system 20 furthermore may have an optional restoring simulator 25. In the positioner system 20 exemplarily shown in FIG. 1, master brake cylinder 22 is actuable with the aid of actuation device 21, which is shown in FIG. 1 as a foot pedal by way of example. The actuation of master brake cylinder 22 includes a displacement of one or more displacement piston(s) 22A, 22B, whereby a hydraulic fluid such as oil is displaced against a restoring force, so that a hydraulic pressure is generated in actuating circuit 2.

The restoring force, for example, is able to be generated by optional restoring simulator 25, which is coupled in a hydraulic, i.e., fluid-conducting, manner to master brake cylinder 22 by way of a hydraulic line 6.

Optional pressure sensor 23 acquires the pressure generated by master brake cylinder 22 and generates a pressure signal 3A representing this pressure. Pressure sensor 23 in FIG. 1 is hydraulically coupled via restoring simulator 25 to hydraulic line 6 by way of example. Optional positioning-travel sensor 24 detects a positioning travel undertaken by actuation device 21 and generates a positioning-travel signal 3B which represents the positioning travel. Pressure signal 3A and positioning-travel signal 3B jointly form an exemplary brake request signal 3 in this case, which is generated with the aid of positioner system 20.

As an alternative, positioner system 20 may also be formed only by positioning-travel sensor 24, which acquires the positioning travel of actuation device 21. In this case brake request signal 3 is formed by positioning-travel signal 3B.

Active circuit 4 has a pressure generation device 40, at least one wheel brake 43, and at least one isolation valve 44. Active circuit 4 optionally also has a brake-control valve system 47. In FIG. 1 an active circuit 4, which has a total of four wheel brakes 43A, 43B, 43C, 43D and two isolation valves 44A, 44B, is shown by way of example.

Pressure generation device 40 preferably has an electric motor 41 and a displacement piston 42, which is movable in a translatory fashion with the aid of electric motor 41. To convert a rotational movement of electric motor 41 into a translation movement of displacement piston 42, a gear unit 41A is provided, which is only schematically illustrated in FIG. 1 and kinetically couples electric motor 41 with displacement piston 42. Displacement piston 42 is movable in a guide cylinder 42A, thereby bringing about a displacement of hydraulic fluid such as oil situated in guide cylinder 42A.

Isolation valves 44A, 44B are able to be realized as electromechanical switching valves, for instance. Isolation valves 44A, 44B are switchable between an open state in which they allow fluid to pass through, and a closed state in which isolation valves 44A, 44B block the passage of fluid. FIG. 1 shows isolation valves 44A, 44B in a closed state by way of example.

Wheel brakes 43A, 43B, 43C, 43D act via friction coatings (not shown) on friction surfaces provided on a respective wheel (not shown), e.g., in the form of a brake disk 7, 7A, 7B, 7C, 7D, in order to brake the respective wheel.

Optional brake-control valve system 47 is shown only schematically in FIG. 1 and used for the individual control of respective wheel brakes 43A, 43B, 43C, 43D. Brake-control valve system 47 will not be further described here for reasons of clarity.

Isolation valves 44A, 44B are hydraulically coupled with pressure generation device 40 via a branching hydraulic line 15. Furthermore, first pressure valve 44A is coupled via a branching hydraulic line 16 to brake disks 7A and 7B of the wheels (not shown). Second pressure valve 44B is coupled via a branching hydraulic line 17 with brake disks 7C and 7D of the wheels (not shown). Hydraulic lines 15, 16, 17 thus form a hydraulic path 45 between pressure generation device 40 and the at least one wheel brake 43. Hydraulic lines 16, 17 connected to wheel brakes 43 form a brake-side section 45A of hydraulic path 45. Hydraulic line 15 connected to pressure generation device 40 forms a pressure-generation-side section 45B of hydraulic path 45.

Moreover, FIG. 1 shows that an optional brake-pressure sensor 46 for acquiring a brake pressure in pressure-generation-side section 45B of hydraulic path 45 is able to be provided. By way of example, FIG. 1 also shows optional motor sensors 47A, 47B for acquiring operating variables of the electric motor such as an operating current or a rotary position.

As illustrated in FIG. 1, actuating circuit 2 may be hydraulically coupled with active circuit 4 via optional valves 26A, 26B in order to enable an actuation of wheel brakes 43 via master brake cylinder 22 in the event of an operating failure of pressure generation device 40. To this end, displacement pistons 22A, 22B are connected to hydraulic lines 16, 17 via valves 26A, 26B, these valves 26A, 26B possibly having a similar design as isolation valves 44A, 44B. FIG. 1 shows valves 26A, 26B in a closed state.

As additionally illustrated in FIG. 1, control unit 5 is connected to positioner system 20 of actuating circuit 2, in particular to sensors 23, 24 of positioner system 20, and to pressure generation device 40. Moreover, control unit 5 may be connected to optional isolation valves 44A, 44B, to optional valves 26A, 26B, to optional brake-pressure sensor 46 as well as to optional motor sensors 47A, 47B. In this context "connected" describes a functional connection, in particular a data connection, which may be realized in a wire-conducted or wireless manner.

Control unit 5 in particular may have a processor (not shown) and a data memory (not shown), the data memory including software which is set up to induce the processor to execute the functions described in the following text or the method described in the following text.

Hereinafter, the method according to the present invention will be described by way of example based on the afore-described brake system 1.

Figure 2:
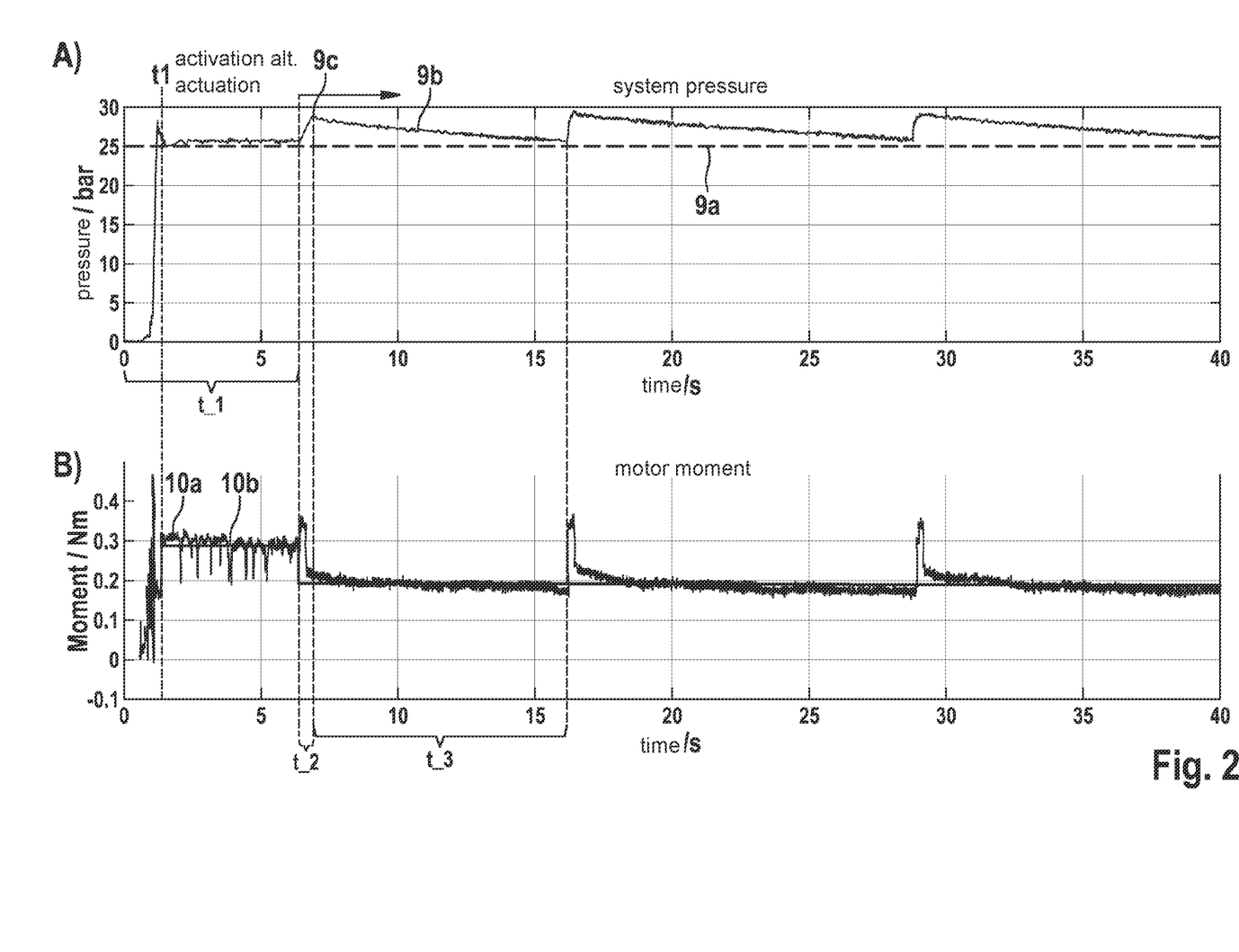
FIG. 2 shows a pressure characteristic in an active circuit of the brake system illustrated in FIG. 1, in particular in a pressure-generator-side section of a hydraulic path, as well as a torque characteristic of an electric motor of the active circuit of the brake system illustrated in FIG. 1 during the execution of a method according to an exemplary embodiment of the present invention.

FIG. 2 shows in a first diagram A a pressure characteristic in active circuit 4 of brake system 1, in particular the pressure characteristic ascertained with the aid of brake-pressure sensor 46 in pressure-generator-side section 45B of hydraulic path 45, plotted over time. In a second diagram B, FIG. 2 shows a torque characteristic of electric motor 41 which results for the generation of the pressure characteristic illustrated in diagram A.

As illustrated in FIG. 2, a brake request signal 3, which characterizes a brake request, is generated at instant O by an actuation of positioner system 20 of actuating circuit 2. For example, actuation device 21 is moved so that master brake cylinder 22 is operated against the restoring force of optional restoring simulator 25. Pressure sensor 23 and positioning-travel sensor 24 acquire a pressure and a positioning travel, respectively. Pressure sensor 23 generates a corresponding pressure signal 3A, and positioning-travel sensor 24 generates a corresponding positioning-travel signal 3B. These form brake request signal 3 and are transmitted to control unit 5.

On the basis of brake request signal 3, control unit 5 ascertains a setpoint brake pressure required in active circuit 4 and generates a corresponding motor control signal 5M, which is transmitted to electric motor 41 of pressure generation device 40.

Electric motor 41 is operated according to motor control signal 5M and thereby moves displacement piston 42 in such a way that setpoint brake pressure 9a is set in active circuit 4. In the process, a closed-loop control, in which actual brake pressure 9b in active circuit 4 is controlled according to setpoint brake pressure 9a, is optionally able to be realized with the aid of optional brake pressure sensor 46. Optional isolation valves 44A, 44B are open. As illustrated in FIG. 2, actual brake pressure 9b is increased until setpoint brake pressure 9a is reached at instant t1, i.e. after approximately one second, in this case. In FIG. 2, setpoint brake pressure 9a lies at a pressure of approximately 25 bar, for example. By setting actual brake pressure 9b to a value greater than 0 bar, wheel brakes 43 are actuated.

As may furthermore be gathered from FIG. 2, setpoint brake pressure 9a remains constant over a predefined time period t_1 of 6 seconds, for instance. This corresponds to a constant brake request signal 3. "Constant" in this context in particular means that a change in brake request signal 3 is smaller than a predefined value. For instance, brake request signal 3 is constant when neither pressure signal 3A nor positioning-travel signal 3B changes by more than a predefined value, e.g., by no more than 1%, within a predefined period of time such as across three seconds, or—as shown by way of example in FIG. 2—across six seconds. A constant brake request signal 3 results in a constant setpoint brake pressure 9a as well as in a constant actual brake pressure 9b, as may be gathered from FIG. 2.

As shown in diagram B in FIG. 2, electric motor 41 of pressure generation device 40 has to supply an increasing brake torque 10a for the displacement of displacement piston 42 until actual brake pressure 9b is set to setpoint brake pressure 9a at instant t1. Starting with instant t1, actual brake pressure 9b is kept at the level of setpoint brake pressure 9a. For this purpose, electric motor 41 has to apply an approximately constant torque 10a in order to hold displacement piston 42. Starting with instant t1, a mean torque 10b, which has to be applied by electric motor 41 for holding displacement piston 42 so that actual brake pressure 9b is kept at the level of setpoint brake pressure 9a, lies at approximately 0.28 Nm.

Under the condition that brake request signal 3 is constant over predefined time period t_1, a pressure modulation of actual brake pressure 9b takes place, as shown by way of example in FIG. 2. The pressure modulation in particular includes a pressure increase, i.e. the setting of actual brake pressure 9b in active circuit 4 to a value 9c that is greater than setpoint brake pressure 9a, and a subsequent pressure reduction of actual brake pressure 9b from this value until setpoint brake pressure 9a has been reached again.

Preferably, the pressure increase of actual brake pressure 9b is carried out considerably faster than the pressure reduction. It is shown in FIG. 2 by way of example that a pressure increase by approximately 3 bar takes place within a time t_2 of approximately 0.25 seconds and the pressure reduction by the same value to the setpoint brake pressure of 25 bar occurs within a time t_3 of approximately 12 seconds. In general, the setting of the actual brake pressure in active circuit 4 to a value that is greater than the setpoint brake pressure may be carried out using a temporal pressure gradient which is ten to fifty times greater than a temporal pressure gradient by which the reduction of the actual brake pressure to the setpoint brake pressure is achieved.

Figure 3:
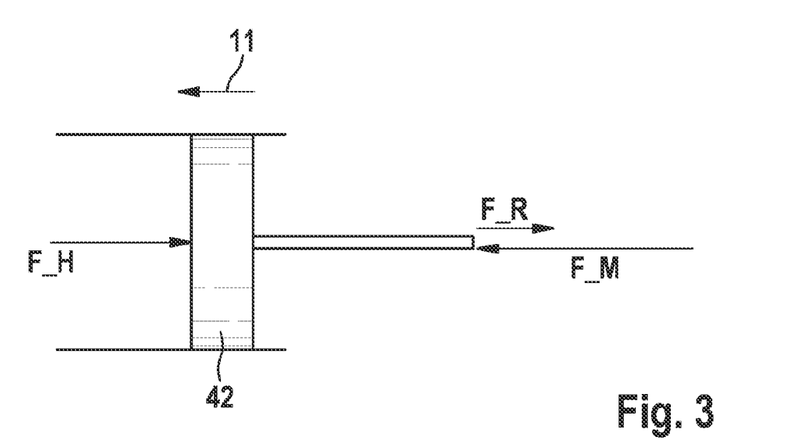
FIG. 3 shows the force relationships at a pressure generation device during a pressure increase in the active circuit of the brake system during the execution of a method according to an exemplary embodiment of the present invention.

In order to carry out the pressure modulation of actual brake pressure 9b, control unit 5 generates a motor control signal 5M based on which electric motor 41 is actuated so that a movement of displacement piston 42 is produced. As shown in FIG. 3 in an exemplary and schematic manner, a movement of displacement piston 42 in a first direction 11 takes place during the pressure increase. In the process, a force F_H, which results from the pressure application to the hydraulic fluid in active circuit 4, acts on displacement piston 42. This force F_H is provided by electric motor 41 which, however, additionally has to overcome friction losses F_R in gear unit 41A during the movement of piston 42 in first direction 11. During time t_2, electric motor 41 thus supplies motor force F_M for the displacement of displacement piston 42 in first direction 11 during the pressure increase, motor force M_F, generally speaking, corresponding to force F_H plus friction force F_R from the gear unit losses.

Figure 4:
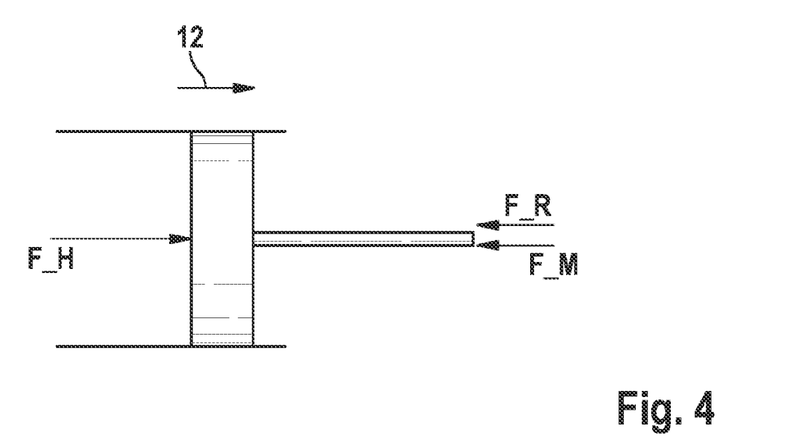
FIG. 4 shows the force relationships at the pressure generation device during a pressure reduction in the active circuit of the brake system during the execution of a method according to an exemplary embodiment of the present invention.

As shown in FIG. 4, a movement of displacement piston 42 in a second direction 12, i.e. a movement counter to first direction 11, takes place during the pressure reduction. Force F_H, which results from the pressure application to the hydraulic fluid in active circuit 4, is acting on displacement piston 42 in the process. This force F_H is supplied by electric motor 41. However, during the movement of displacement piston 42 in second direction 12, friction losses F_R in gear unit 41A act counter to the movement of piston 42. During time t_3, electric motor 41A thus supplies motor force F_M for the displacement of displacement piston 42 in second direction 12 during the pressure reduction, motor F_M in simplified terms corresponding to force F_H minus friction force F_R from the gear unit losses. In particular, force F_R thus acts counter to force F_H so that the loading of electric motor 41 is reduced because force F_R supports motor force F_M.

As illustrated in FIG. 2, for the pressure increase, electric motor 41 initially has to supply a high torque 10a for the short time period t_2. During the pressure reduction, in addition to electric motor 41, displacement piston 42 is also decelerated by the friction losses that occur in gear unit 41A, which results in a low torque 10a of electric motor 41 during time period t_3. Since time period t_2 is considerably shorter than time period t_3, mean torque 10b is approximately constant during the combined time period t_2 and t_3 of the pressure modulation. As may be gathered from FIG. 2, mean torque 10b during the pressure modulation lies at approximately 0.18 Nm and thus clearly below the value of 0.28 during the time period starting with instant t1, during which actual brake pressure 9b is maintained at the level of setpoint brake pressure 9a. In an advantageous manner, the pressure modulation therefore makes it possible to reduce mean torque 10b, and thus the thermal and mechanical loading of electric motor 41.

As shown in FIG. 2, the pressure modulation is able to be carried out multiple times in succession as long as brake request signal 3 or setpoint brake pressure 9a is constant.

Optionally, after a certain time period has elapsed or following a certain number of pressure modulations, hydraulic decoupling of the at least one wheel brake 43 from pressure generation device 40 is able to take place by closing the at least one isolation valve 44. For this purpose, under the condition that brake request signal 3 is constant over a predefined second time period, control unit 5 generates a valve control signal 5V, which causes isolation valves 44A, 44B to close. Electric motor 41 can then be switched off, the actual brake pressure in the brake-side section 45A of hydraulic path 45 being kept constant by closed isolation valves 44A, 44B.

The execution of the pressure modulation may optionally be linked with the presence of further conditions. For example, it is possible to acquire a wheel speed of the wheels at the wheels with the aid of wheel speed sensors 18A, 18B, 18C, 18D and to transmit it as rotational speed signal 5D to control unit 5. The execution of the pressure modulation may then take place under the additional condition that the acquired rotational speed is smaller than a predefined rotational speed threshold value. Also, it may be required as an additional condition that the ascertained setpoint brake pressure of active circuit 4 is greater than a predefined pressure threshold value. Alternatively or additionally, it may also be required as a condition that a variable characterizing the thermal loading of electric motor 41 of the pressure generation device reaches a predefined loading threshold value. For example, the operating current acquired with the aid of motor sensor 47A is able to be transmitted to control unit 5 as current signal 5I. If operating current 5I lies above a limit value for a certain time, then isolation valves 44 are closed.

What is claimed is:

1. A method for operating a brake system for a vehicle, the method comprising the following steps:
   generating a brake request signal which characterizes a brake request, by actuating a positioner system of an actuating circuit;
   ascertaining a setpoint brake pressure required in an active circuit based on the brake request signal;
   setting an actual brake pressure in the active circuit according to the setpoint brake pressure using a pressure generation device by moving a displacement piston of the pressure generation device using an electric motor of the pressure generation device to actuate a wheel brake coupled with the active circuit; and
   under a condition that the brake request signal is constant over a predefined time period, carrying out a pressure modulation, which includes varying the actual brake pressure, while the brake request signal remains constant, by performing multiple times: (i) setting the actual brake pressure in the active circuit to a value that is greater than the setpoint brake pressure, and (ii) lowering the actual brake pressure until the setpoint brake pressure is reached by moving the displacement piston using the electric motor.

2. The method as recited in claim 1, wherein the setting of the actual brake pressure in the active circuit to the value greater than the setpoint brake pressure takes place using a temporal pressure gradient which is between ten and fifty times greater than a temporal pressure gradient by which the actual brake pressure is reduced until the setpoint brake pressure is reached.

3. The method as recited in claim 1, wherein the carrying out of the pressure modulation additionally requires the presence of one or more of the following conditions:
   an acquired rotational speed of a wheel decelerated by the wheel brake is less than a predefined rotational speed threshold value,
   the ascertained setpoint brake pressure of the active circuit is greater than a predefined pressure threshold value,
   a variable characterizing a thermal loading of the electric motor of the pressure generation device reaches a predefined loading threshold value.

4. The method as recited in claim 1 wherein under a condition that the brake request signal is constant over a second predefined period of time, a hydraulic decoupling of the wheel brake from the pressure generation device takes place by closing an isolation valve, which is situated in a hydraulic path between the pressure generation device and the wheel brake, and by switching off the electric motor.

5. The method as recited in claim 1, wherein the positioner system has a master brake cylinder which is actuable by an actuation device, and a sensor system, and the generation of the brake request signal includes: (i) an acquisition of a hydraulic pressure generated by the actuation of the master brake cylinder in the actuating circuit, and/or (ii) an acquisition of a positioning travel of the actuation device as variables characterizing the brake request.

6. The method as recited in claim 1, wherein the varying of the brake pressure, while the brake request signal remains constant, is performed in such a way that a temporal actual pressure characteristic of the brake pressure approximates a saw-tooth function.

7. A brake system for a vehicle, comprising:
   an actuating circuit including a positioner system, actuable by an actuation device, configured for generation of a brake request signal;
   an active circuit having a pressure generation device, which includes an electric motor and a displacement piston which is movable in a translatory fashion using the electric motor and coupled with the electric motor by a gear unit, and at least one wheel brake, which is hydraulically coupled with the pressure generation device; and
   a control unit which is connected to the positioner system of the actuating circuit and to the pressure generation device of the active circuit, the control unit being configured to ascertain from the brake request signal a setpoint brake pressure required in the active circuit, to actuate the electric motor of the pressure generation device for setting an actual brake pressure in the active circuit according to the setpoint brake pressure, and, under the condition that the brake request signal is constant over a predefined period of time, to actuate the electric motor to carry out a pressure modulation, which includes varying the actual brake pressure, while the brake request signal remains constant, by performing multiple times: (i) setting the actual brake pressure in the active circuit to a value that is greater than the setpoint brake pressure, and (ii) lowering the actual brake pressure until the setpoint brake pressure is reached.

8. The brake system as recited in claim 7, wherein the positioner system has a master brake cylinder which is actuable by the actuation device, and a sensor system configured to: (i) acquire a hydraulic pressure generated by an actuation of the master brake cylinder in the actuating circuit, and/or (ii) acquire a positioning travel of the actuation device as variables characterizing a brake request, and the brake request signal is formed by the variables that characterize the brake request and are acquired using the sensor device.

9. The brake system as recited in claim 7, wherein the active circuit has a pressure sensor configured to acquire the actual brake pressure in the active circuit, which is connected to the control unit, and the control unit is configured to actuate the electric motor for control of the actual brake pressure based on the acquired actual brake pressure.

10. The brake system as recited in claim 7, wherein the active circuit has an isolation valve, which is situated in a hydraulic path between the pressure generation device and the wheel brake, and the control unit is configured to close the isolation valve for a hydraulic decoupling of the wheel brake from the pressure generation device and to switch off the electric motor of the pressure generation device.

11. The brake system as recited in claim 7, wherein the carrying out of the pressure modulation additionally requires the presence of one or more of the following conditions:
- an acquired rotational speed of a wheel decelerated by the wheel brake is less than a predefined rotational speed threshold value,
- the ascertained setpoint brake pressure of the active circuit is greater than a predefined pressure threshold value,
- a variable characterizing a thermal loading of the electric motor of the pressure generation device reaches a predefined loading threshold value.

12. The brake system as recited in claim 7, wherein under a condition that the brake request signal is constant over a second predefined period of time, a hydraulic decoupling of the wheel brake from the pressure generation device takes place by closing an isolation valve, which is situated in a hydraulic path between the pressure generation device and the wheel brake, and by switching off the electric motor.

13. The brake system as recited in claim 7, wherein the positioner system has a master brake cylinder which is actuable by an actuation device, and a sensor system, and the generation of the brake request signal includes: (i) an acquisition of a hydraulic pressure generated by the actuation of the master brake cylinder in the actuating circuit, and/or (ii) an acquisition of a positioning travel of the actuation device as variables characterizing the brake request.

14. The brake system as recited in claim 7, wherein the varying of the brake pressure, while the brake request signal remains constant, is performed in such a way that a temporal actual pressure characteristic of the brake pressure approximates a saw-tooth function.

* * * * *